(12) United States Patent
Bedros et al.

(10) Patent No.: US 8,385,685 B2
(45) Date of Patent: Feb. 26, 2013

(54) SYSTEM AND METHOD FOR OCULAR RECOGNITION

(75) Inventors: Saad J. Bedros, West St. Paul, MN (US); Jana Trojanova, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 77 days.

(21) Appl. No.: 13/155,548

(22) Filed: Jun. 8, 2011

(65) Prior Publication Data
US 2012/0314913 A1 Dec. 13, 2012

(51) Int. Cl.
*G06K 9/00* (2006.01)
*G06K 9/36* (2006.01)

(52) U.S. Cl. .................. 382/284; 382/117; 382/128

(58) Field of Classification Search .................. None
See application file for complete search history.

(56) References Cited

U.S. PATENT DOCUMENTS

| | | | |
|---|---|---|---|
| 4,729,652 A * | 3/1988 | Effert .......................... 351/210 |
| 5,293,187 A * | 3/1994 | Knapp et al. ................. 351/210 |
| 5,625,408 A * | 4/1997 | Matsugu et al. ............... 348/42 |
| 5,917,940 A * | 6/1999 | Okajima et al. .............. 382/173 |
| 6,005,984 A * | 12/1999 | Kawakami et al. ........... 382/276 |
| 6,247,813 B1 * | 6/2001 | Kim et al. ...................... 351/206 |
| 6,314,248 B1 * | 11/2001 | Ohmura et al. ............... 396/429 |
| 6,373,965 B1 * | 4/2002 | Liang ............................ 382/112 |
| 6,386,706 B1 * | 5/2002 | McClure et al. .............. 351/237 |
| 6,419,638 B1 * | 7/2002 | Hay et al. ...................... 600/558 |
| 6,714,665 B1 * | 3/2004 | Hanna et al. .................. 382/117 |
| 7,043,074 B1 * | 5/2006 | Darbee ........................ 382/154 |
| 7,155,035 B2 * | 12/2006 | Kondo et al. ................. 382/117 |
| 7,519,199 B2 * | 4/2009 | Kondo et al. ................. 382/117 |
| 7,583,823 B2 * | 9/2009 | Jones et al. ................... 382/117 |
| 7,664,295 B2 * | 2/2010 | Kondo et al. ................. 382/117 |
| 7,734,069 B2 * | 6/2010 | Kondo et al. ................. 382/117 |
| 8,092,023 B2 * | 1/2012 | Korb et al. .................... 351/206 |
| 2003/0152252 A1 * | 8/2003 | Kondo et al. ................. 382/117 |
| 2005/0226470 A1 * | 10/2005 | Kondo et al. ................. 382/117 |
| 2007/0160308 A1 * | 7/2007 | Jones et al. ................... 382/260 |

* cited by examiner

*Primary Examiner* — Manav Seth
(74) *Attorney, Agent, or Firm* — Schwegman, Lundberg & Woessner, P.A.

(57) ABSTRACT

A system and method include decomposing via a computer an ocular region into several filtered images of different orientation and scale, using the computer to combine the decomposed images for each scale, using a computer executed classifier for each scale, matching across different quality images, and using a computer, constructing a matching score by combining the scale scores using adaptively weighted sum for each scale.

10 Claims, 9 Drawing Sheets

$$S_W = \sum_{i=1}^{L} \sum_{\vec{x}_k \in C_i} (\vec{x}_k - \vec{m}_i)(\vec{x}_k - \vec{m}_i)^T \quad S_B = \sum_{i=1}^{L} (\vec{m}_i - \vec{m})(\vec{m}_i - \vec{m})^T$$

$$J(w) = \frac{w^T S_B w}{w^T S_W w}$$

SYSTEM AND METHOD FOR OCULAR RECOGNITION

GOVERNMENT FUNDING

This invention was made with Government support under Contract Number W911NF-10-000027 awarded by IARPA. The United States Government has certain rights in the invention.

BACKGROUND

Matching low quality iris images leads to loss of iris information. The loss of iris information leads to non effective matching of the iris. Exploiting the ocular information of a captured image may be of interest in identifying a subject from a list of people using the low quality ocular image.

SUMMARY

A system and method include decomposing an ocular region via a computer into several filtered images of different orientation and scale. The computer is used to combine the decomposed images for each scale. A computer executed classifier is used for each scale to match across different quality images and construct a matching score by combining the scale scores using adaptively weighted sum for each scale.

In a further embodiment, a system and method includes decomposing via a computer an ocular region into several filtered images of different orientation and scale, extracting multiple gradient orientations, splitting each decomposition of the ocular region of an eye into local neighborhoods, extracting histograms for the local neighborhoods, and matching the histograms and combining a weighted sum of the matching scores.

DETAILED DESCRIPTION

Figure 1A:
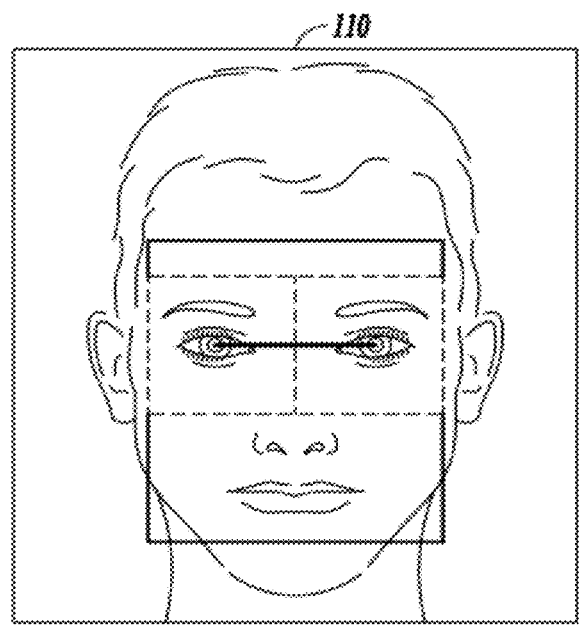
FIGS. 1A, 1B, and 1C are illustrations of three methods of cropping an ocular region from a face according to an example embodiment.

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that structural, logical and electrical changes may be made. The following description of example embodiments is, therefore, not to be taken in a limited sense, and the scope is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Holistic appearance feature extraction of the shape of an eye and its surrounding area is used to uniquely identify people from a list of people. The holistic ocular appearance extends to the eyebrow and surrounding spatial features of the eye shape. An ocular region is decomposed into several filtered images of different orientation and scales. The decomposed images may be obtained using Log Gabor or Gabor filters with discriminatively tuned parameters. The images of each frequency scale across all orientations are combined and a fisher classifier is constructed for each scale. Robust matching across different quality of images is obtained using adaptively weighted scores for each scale. The weights are calculated based on the energy of each scale normalized by the total energy of the image.

In one embodiment, local appearance feature extraction around the eye is performed by splitting an image into local neighborhoods, and extracting multiple gradient orientations. Once different filtered images are obtained such as via discriminatively tuned Gabor or Log Gabor filters, histograms for local neighborhoods are extracted and matched for best similarity evaluation.

A holistic view of the eye appearance and analysis of local features of its surroundings may be used with iris recognition methods to augment combined ocular and iris recognition systems. Integrating appearance based ocular recognition and iris recognition may provide improved matching results.

The effectiveness of holistic ocular appearance algorithms is dependent on minimization of the operational and environmental changes outlined mainly by the expression, pose, and illumination variations of the human face. Preprocessing is utilized to minimize these variations by standardizing the captured image to fit the characteristics of ocular images in a gallery database (size, pose, illumination, etc.). The standardization or preprocessing of the ocular region contains two main steps: ocular registration and photometric normalization. The ocular quality metrics are extracted right after the registration, since the photometric normalization can lead to some loss of information.

With a detected eye, the ocular region must be standardized for size and position (with respect to the gallery database samples). This process is called image registration, and its goal is to transform the image (realign/register) so the key facial landmarks (e.g. eye centers or corners) are located on same position, while keeping the biometric characteristic unchanged (e.g. shape of the eye).

To register a new image, the facial landmark's positions should be precisely detected. Proper localization of facial landmarks is desired. Without proper localization of facial landmarks, the recognition process may not be successful. Recognition is more likely to succeed if the probe and gallery images are aligned by size and pose. The registration algorithm realigns the image to some degree of variation (limits are: eyebrow moved up/down, out of plane rotation of maximal ±15 degrees). The registration may not be entirely accurate for higher degrees of the pose variation.

Figure 1B:
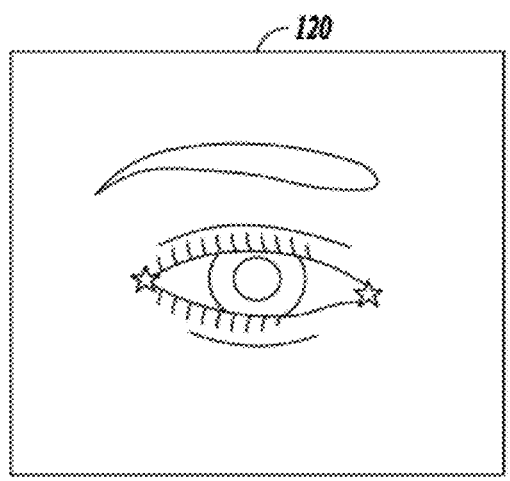
Figure 1C:
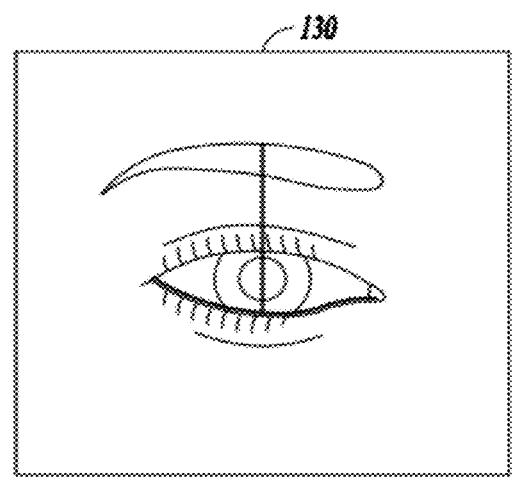

The input data can be registered by various methods, here three techniques may be used, as shown in FIGS. 1A, 1B, and 1C. At 110, CROP1 uses eye centers and utilizes a full-face image. Plane rotation is removed, and fixed eye centers located. At 120, CROP2 uses eye corners. Plane rotation is also removed, and eye corner positions are fixed. At 130, CROP3 uses the bottom eyelid and a point on the eyebrow. We fix the bottom eyelid parabola and the orbital distance.

Figure 2A:
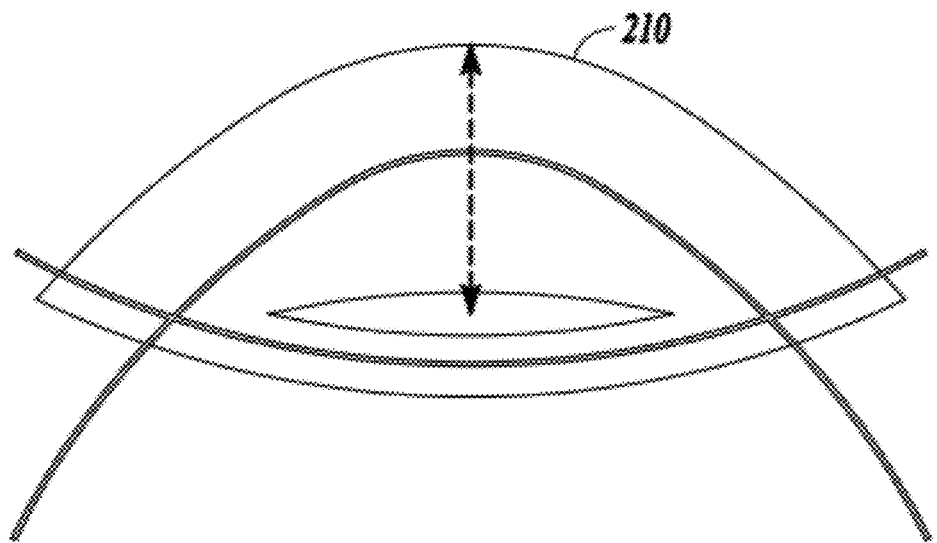
FIGS. 2A and 2B illustrate aligned eye shape by lower lid and masking out of the eyes according to an example embodiment.
Figure 2B:
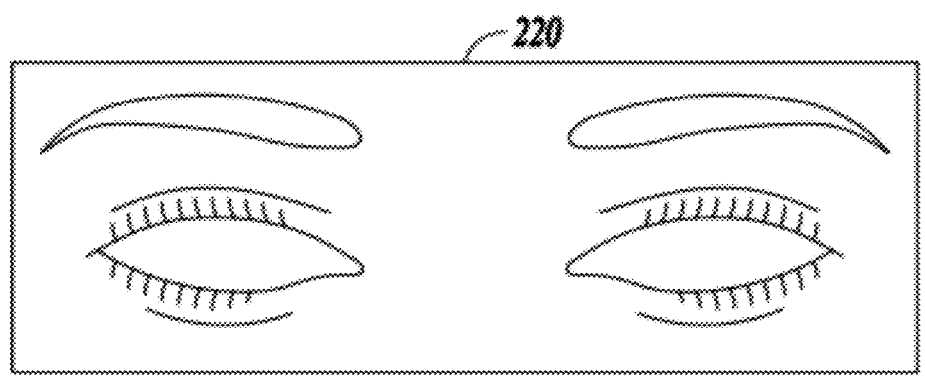

The last method aligns the bottom eyelid to approximately same position, as seen at 210 in FIGS. 2A and 2B. The upper eyelid has a lot of variation (from fully open to closed eye). Additionally, the eye region is masked out as shown at 220. A set of images to be matched in the gallery database also has the eye region masked out.

The illumination of the images is normalized in order to reduce the variability of the signal and highlight the local variations of the region. Two types of photometric normalization, self quotient image (SQI) and histogram equalization (HE) may be used.

Image quality assessment is typically used for vision system processing under wide image degradation. The goal of this assessment is to estimate degradations so the best discriminative features are selected for best matching. Quality factors with respect to biometric system performance are considered. Two main factors influencing the quality are: variation of subject characteristics and conditions during the acquisition.

Quality factors related to the subject include static anatomical characteristics, such as hair (bang on forehead), glasses, permanent jewelry, makeup, and injuries or scars. Dynamic factors corresponding to the behavior of the subject include expression and head pose toward the camera.

In one embodiment, acquisition factors that affect the matching performance include both static and dynamic factors. Static factors relate to the device properties, and dynamic factors relate to environmental conditions. Factors include spatial resolution (eye size and distance between the eyes), spatial frequencies, (brightness, contrast, and focus), dynamic range of ocular region (bits of intensity per pixel), shadows (uneven lighting), and specular reflection (saturation). The selected quality metrics are rather simple and fast. They address: spatial resolution, spatial frequencies, dynamic range of ocular region, and specular reflection. The following quality scores are defined:

Ocular Region Size Score
Dynamic Range Score
Brightness Score
Saturation Score
Out of scope score Each quality score $s_i$ is normalized to the range $\langle 0,1 \rangle$. The total score S is computed as weighted average:

$$S = \frac{1}{N} \sum_i w_i \cdot s_i$$

where $W_i$ is a normalized weight for the different scores. Most of the quality metrics for ocular region build on the cumulative histogram of ocular image.

Figure 3:
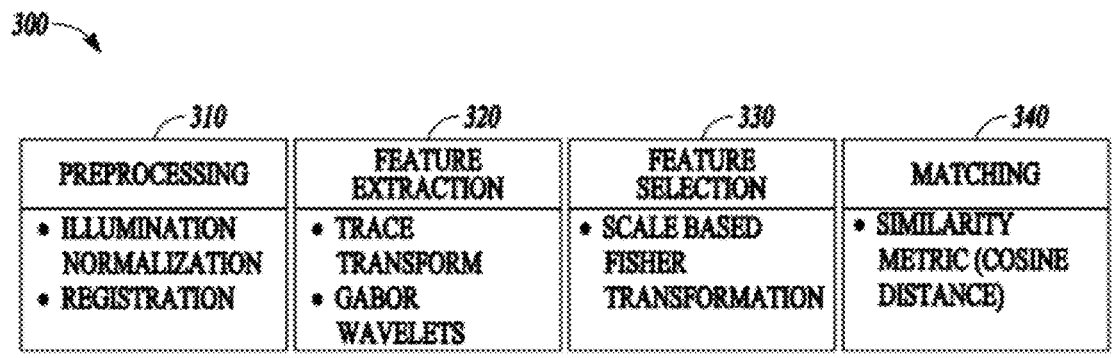
FIG. 3 is a block flow diagram illustrating a holistic ocular appearance recognition module according to an example embodiment.

A holistic ocular appearance recognition module (HOAM) 300 in FIG. 3 is an appearance-based recognition module that extracts discriminative features from the holistic view of the ocular image. The HOAM targets lower frequency features of the ocular region and is expected to be the most robust to image degradation. The holistic ocular appearance extends to the eyebrow and surrounding spatial feature of the eye shape, providing information about the identity of the person—especially when high frequency information is degraded. Human eyes are highly variable, deformable objects, and manifest very different appearances in images depending on changes in pose, expression, lighting, eye closure, eyelid obscuration, and identity of the person. A holistic approach is particularly suited to the task of analyzing the periocular region.

The module extracts biometric information from poor quality eye images that would be rejected by other methods. Another merit is the potential for improved efficiency of ocular identification. The eye-prints may be used to rapidly index a subset of individuals before actually executing the iris recognition. This leads to a faster matching performance for large databases.

The HOAM 300 may also be used to complement iris-based recognition when the acquired image does not contain a proper iris image, and also requires less subject cooperation. It is the least constrained ocular signature. The HOAM module uses the pre-processing 310 (eye localization, alignment, normalization) described above.

A feature extraction module 320 is based on Log-Gabor wavelet filters and a Fisher-based linear discriminant analysis module 330 that reduces the dimensionality of the selected features while maximizing the classification performance. The current framework applies the Fisher classifier for each scale with all orientation filters and then combines the scores for all the scales weighted by an ocular quality metric calculated for each scale to perform matching at 340.

Figure 4:
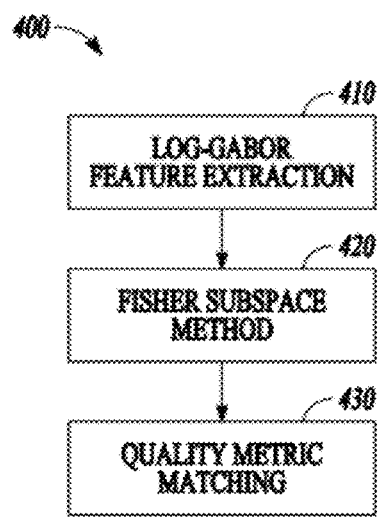
FIG. 4 is a block flow diagram illustrating a Gabor Fisher framework according to an example embodiment.

In one embodiment, Log-Gabor wavelet features from the Gabor wavelets are utilized as indicated in FIG. 4 at 400. A Log-Gabor feature extraction module 410 extracts features. A Fisher subspace method is applied at 420, and quality metric matching is performed at 430.

Figure 5:
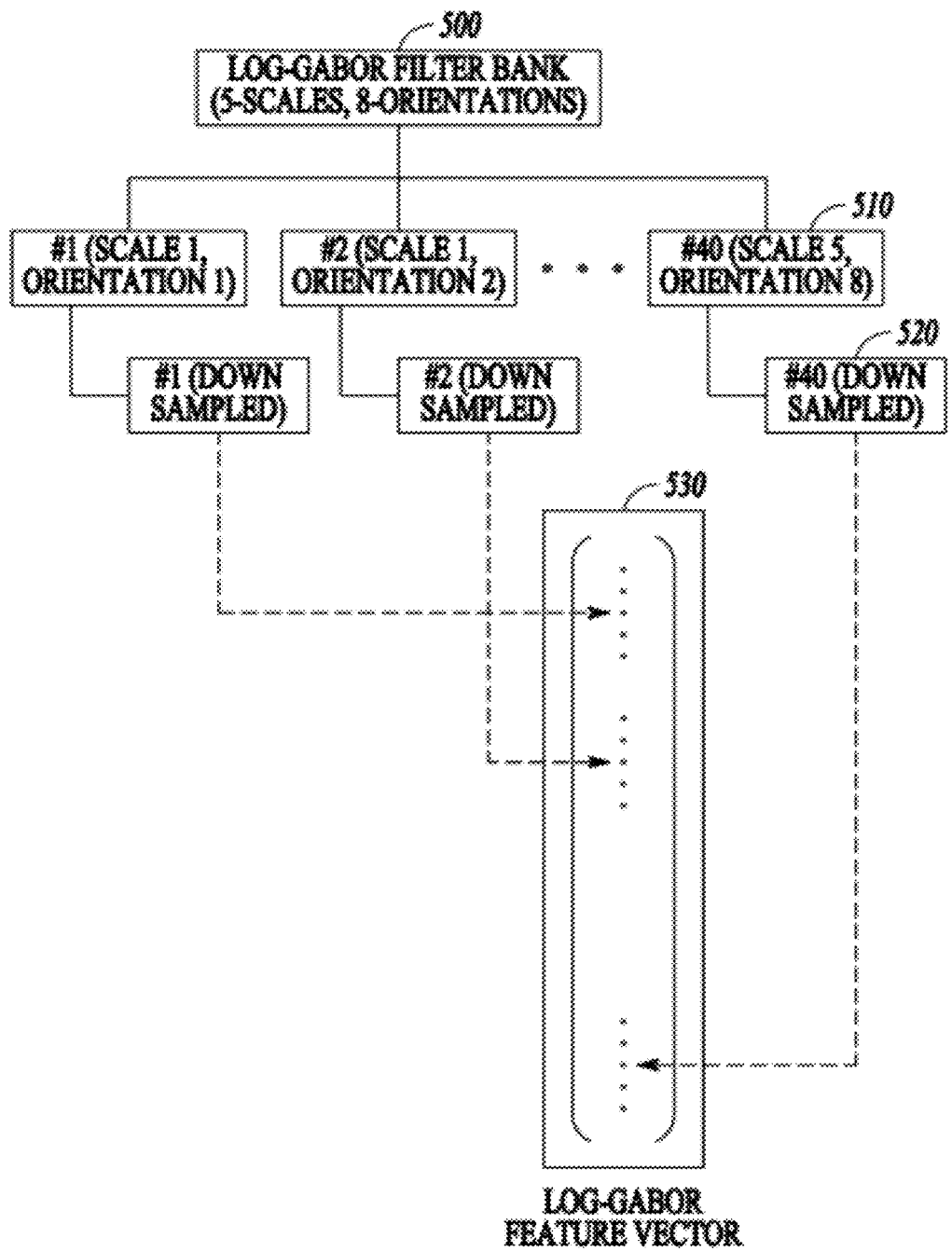
FIG. 5 is a block flow diagram illustrating Log-Gabor feature vector creation according to an example embodiment.

This framework extracts features by applying a Log-Gabor filter bank as illustrated in FIG. 5 at 500 on an ocular image (various scales, orientations). This is less sensitive to illumination variations and its filter scales are tunable for the best discrimination in presence of disturbances. The Log-Gabor parameters are calculated as follows:

$$G(f, \theta) = G(f) \cdot G(\theta) = \exp\left(-\frac{(\log(f/f_0))^2}{2(\log(k/f_0))^2}\right) \cdot \exp\left(-\frac{(\theta - \theta_0)^2}{2\sigma_0^2}\right)$$

Where F=frequency (scale), $\Theta$=orientation, $f_o$=maximum frequency, k=frequency multiplicative factor, and $\sigma$=orientation bandwidth.

Figure 6:
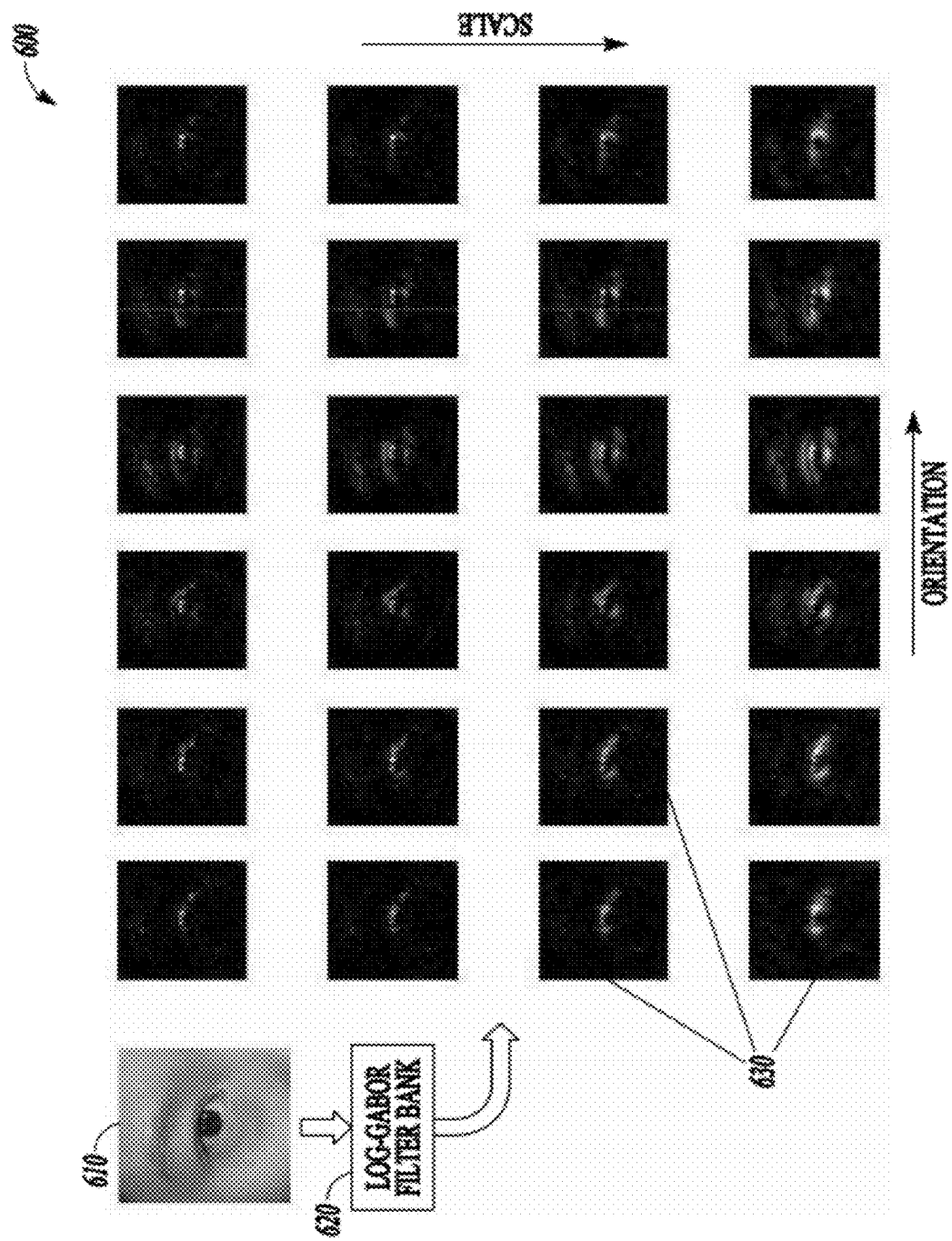
FIG. 6 is a block representation of a Log-Gabor filter bank responses in a gallery according to an example embodiment.

A filter bank 500 is populated as shown in FIG. 5, giving results similar to those in FIG. 6. The Log-Gabor filter bank 500 contains five scales, each having eight orientations 510.

Down sampling may be performed at 520, resulting in a Log-Gabor feature vector 530.

The parameters of the Gabor wavelets are selected to maximize the matching performance 340 of the HOAM module. In one embodiment, 5 scales and 8 orientations are utilized for the HOAM module 300.

The detailed framework for the Gabor-fisher classifier 600 is shown in FIG. 6. The goal of the classifier is to exploit the Gabor features while maximizing the matching performance by projecting the combined feature via a transformation that minimizes the intra-class distances and maximizes the inter-class distances for all available classes. As illustrated, an image 610 is processed through the Log-Gabor filter bank 620 to obtain a matrix of responses 630 that decrease in scale from top to bottom, and change in orientation from left to right.

Figure 7:
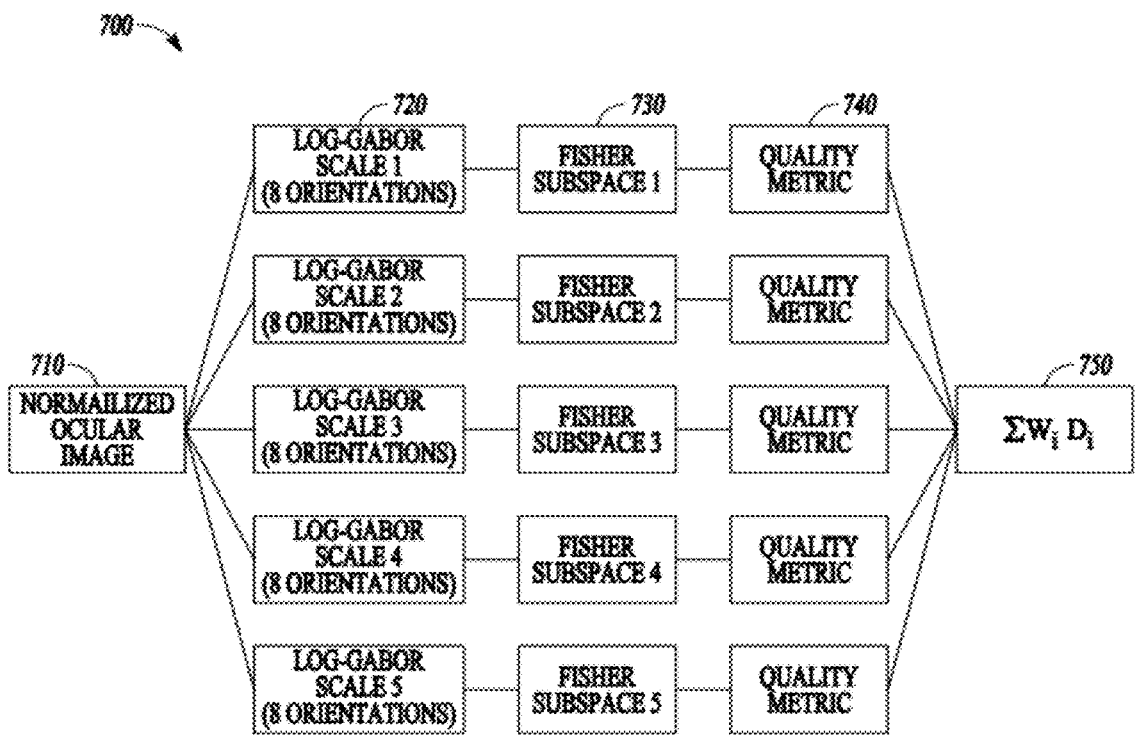
FIG. 7 is a block representation of a scale based Gabor-Fisher classifier according to an example embodiment.

In one embodiment, a Fisher classifier 700 in FIG. 7 is applied for each Gabor scale including all the orientation features. A normalized ocular image is received at 710, and feature extraction using the filter bank is applied on the image at 720. The feature extraction illustrated is a Log-Gabor filter for each of five scales, each with eight orientations. At 730, each scale or band has its own Fischer subspace. A quality metric is applied at 740, and a sum of the quality metric times a score matrix and the scale is obtained at 750.

Figures 8A, 8B:
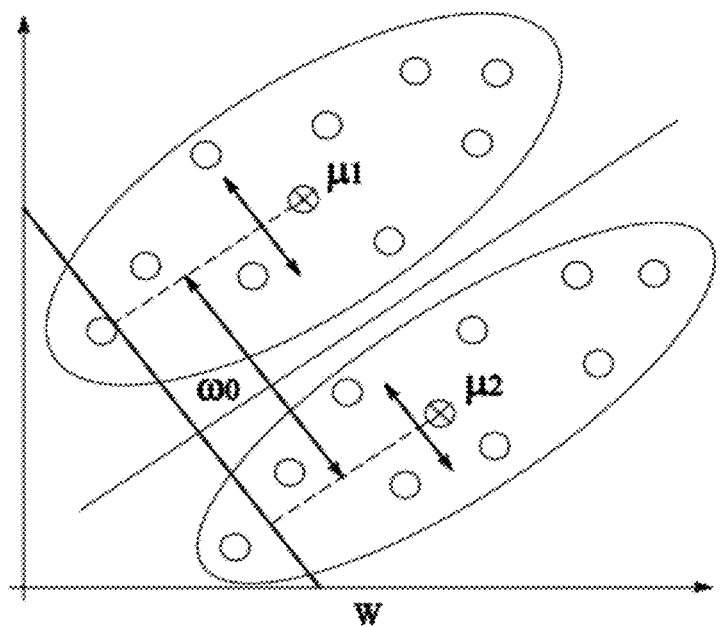
FIGS. 8A and 8B are an algorithm and graph representing a linear discriminant analysis according to an example embodiment.

The Fisher classifier reduces dimensionality via principal component analysis (PCA) and removes noise followed by a Linear discriminant analysis (LDA) 800 in FIGS. 8A and 8B that produces discriminant transformation and maximizes the ratio between the within-class matrix (Sw) and the between-class scatter matrix (Sb) as outlined in FIG. 7.

Each gabor scale computes a score against each target, and the total score is a weighted sum of all the computed scores for all scales.

$$S = \sum_i w_i \cdot s_i$$

The weights are computed based on a quality metric. For the HOAM module, the quality metric is based on the energy in each scale normalized by the total energy in all scales.

Figure 9:
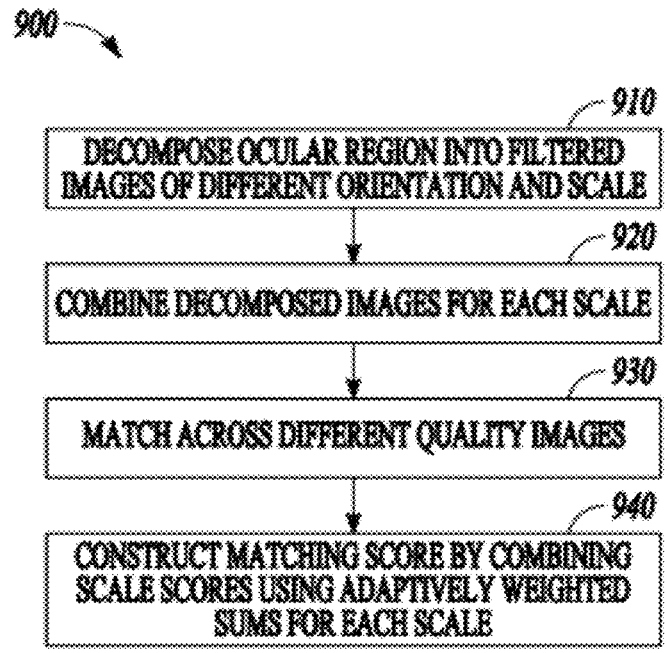
FIG. 9 is a flow chart illustrating a method of matching images across different quality of ocular images according to an example embodiment.
Figure 10:
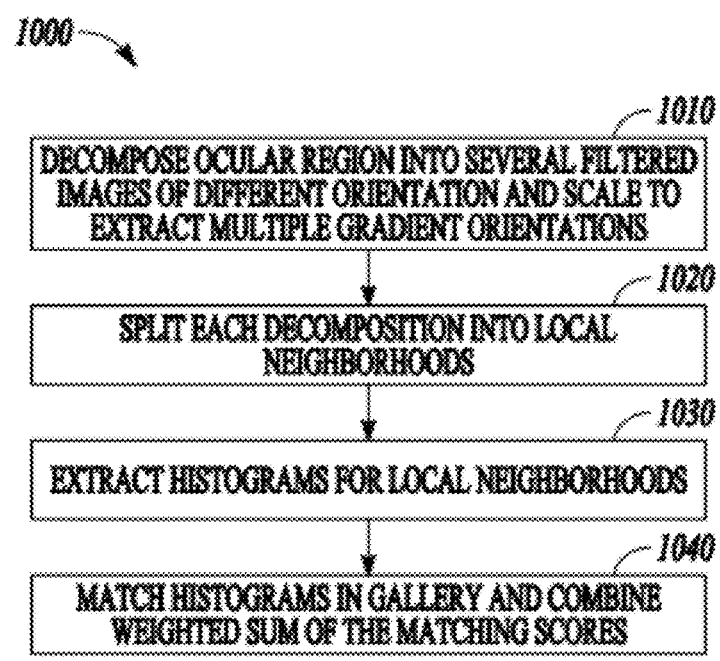
FIG. 10 is a flow chart illustrating a method of matching images using neighborhoods of an ocular region according to an example embodiment.

A method of ocular recognition is illustrated in flow chart form at 900 in FIG. 9. The method includes decomposing 910 via a computer an ocular region into several filtered images of different orientation and scale. The computer is then used to combine the decomposed images for each scale at 920. Using a computer executed classifier for each scale, matching across different quality images is performed at 930. At 940, the computer constructs a matching score by combining the scale scores using an adaptively weighted sums for each scale. In one embodiment, decomposing the ocular region 910 includes using a Gabor filter bank or a Log Gabor filter bank with discriminatively tuned parameters. In one embodiment, the classifier is a fisher classifier. The weights may be based on an energy of each corresponding scale normalized by a total energy of all the scales. A method of ocular recognition is illustrated in flow chart form at 1000 in FIG. 10. At 1010, a computer is used to decompose an ocular region into several filtered images of different orientation and scale and to extract multiple gradient orientations. Each decomposition of the ocular region of the eye is split at 1020 into local neighborhoods. Histograms are extracted for the local neighborhoods at 1030 and are matched to histograms in the gallery at 1040, and a weighted sum of the matching scores is combined.

In one embodiment, decomposing the ocular region is done using a Gabor filter or Log Gabor filter bank with discriminatively tuned parameters. In some embodiments, the weights are based on the energy of the corresponding scale normalized by the total energy of all scales.

Figure 11:
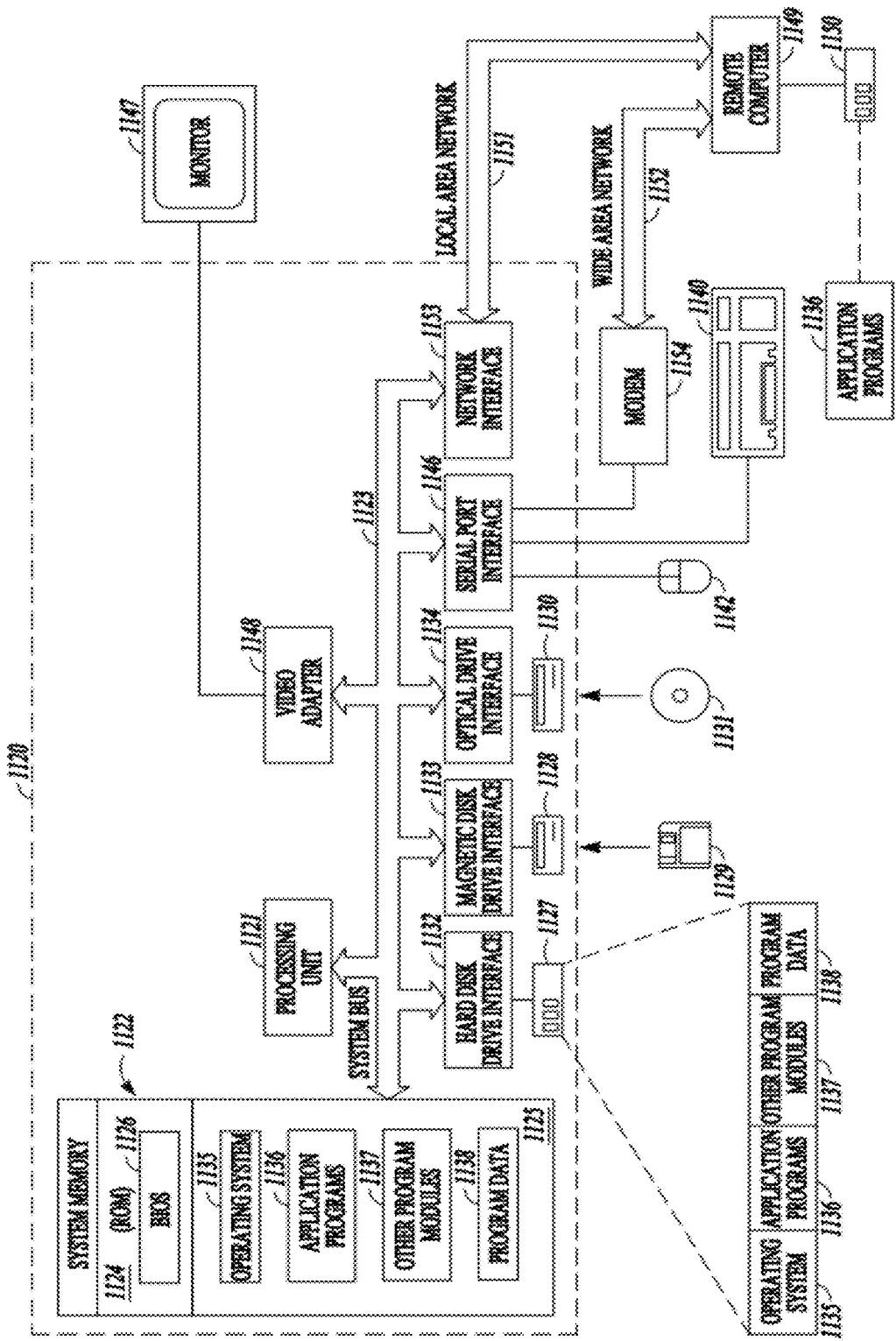
FIG. 11 is a block diagram of a computer system for executing algorithms and methods according to an example embodiment.

FIG. 11 is a block diagram of a computer system to implement methods according to an example embodiment. In the embodiment shown in FIG. 11, a hardware and operating environment is provided that is applicable to any of the servers and/or remote clients shown in the other Figures.

As shown in FIG. 11, one embodiment of the hardware and operating environment includes a general purpose computing device in the form of a computer 1100 (e.g., a personal computer, workstation, or server), including one or more processing units 1121, a system memory 1122, and a system bus 1123 that operatively couples various system components including the system memory 1122 to the processing unit 1121. There may be only one or there may be more than one processing unit 1121, such that the processor of computer 1100 comprises a single central-processing unit (CPU), or a plurality of processing units, commonly referred to as a multi-processor or parallel-processor environment. In various embodiments, computer 1100 is a conventional computer, a distributed computer, or any other type of computer.

The system bus 1123 can be any of several types of bus structures including a memory bus or memory controller, a peripheral bus, and a local bus using any of a variety of bus architectures. The system memory can also be referred to as simply the memory, and, in some embodiments, includes read-only memory (ROM) 1124 and random-access memory (RAM) 1125. A basic input/output system (BIOS) program 1126, containing the basic routines that help to transfer information between elements within the computer 1100, such as during start-up, may be stored in ROM 1124. The computer 1100 further includes a hard disk drive 1127 for reading from and writing to a hard disk, not shown, a magnetic disk drive 1128 for reading from or writing to a removable magnetic disk 1129, and an optical disk drive 1130 for reading from or writing to a removable optical disk 1131 such as a CD ROM or other optical media.

The hard disk drive 1127, magnetic disk drive 1128, and optical disk drive 1130 couple with a hard disk drive interface 1132, a magnetic disk drive interface 1133, and an optical disk drive interface 1134, respectively. The drives and their associated computer-readable media provide non volatile storage of computer-readable instructions, data structures, program modules and other data for the computer 1100. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 1129, optical disk 1131, ROM 1124, or RAM 1125, including an operating system 1135, one or more application programs 1136, other program modules 1137, and program data 1138. Programming for implementing one or more processes or method described herein may be resident on any one or number of these computer-readable media.

A user may enter commands and information into computer 1100 through input devices such as a keyboard 1140 and pointing device 1142. Other input devices (not shown) can include a microphone, joystick, game pad, satellite dish, scanner, or the like. These other input devices are often connected to the processing unit 1121 through a serial port interface 1146 that is coupled to the system bus 1123, but can be connected by other interfaces, such as a parallel port, game port, or a universal serial bus (USB). A monitor 1147 or other type of display device can also be connected to the system bus 1123 via an interface, such as a video adapter 1148. The monitor 1147 can display a graphical user interface for the user. In addition to the monitor 1147, computers typically include other peripheral output devices (not shown), such as speakers and printers.

The computer 1100 may operate in a networked environment using logical connections to one or more remote computers or servers, such as remote computer 1149. These logical connections are achieved by a communication device coupled to or a part of the computer 1100; other types of communication devices may also be used. The remote computer 1149 can be another computer, a server, a router, a network PC, a client, a peer device or other common network node, and typically includes many or all of the elements described above I/O relative to the computer 1100, although only a memory storage device 1150 has been illustrated. The logical connections depicted in FIG. 11 include a local area network (LAN) 1151 and/or a wide area network (WAN) 1152. Such networking environments are commonplace in office networks, enterprise-wide computer networks, intranets and the internet, which are all types of networks.

When used in a LAN-networking environment, the computer 1100 is connected to the LAN 1151 through a network interface or adapter 1153, which is one type of communications device. In some embodiments, when used in a WAN-networking environment, the computer 1100 typically includes a modem 1154 (another type of communications device) or any other type of communications device, e.g., a wireless transceiver, for establishing communications over the wide-area network 1152, such as the internet. The modem 1154, which may be internal or external, is connected to the system bus 1123 via the serial port interface 1146. In a networked environment, program modules depicted relative to the computer 1100 can be stored in the remote memory storage device 1150 of remote computer, or server 1149. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The invention claimed is:

1. A method comprising:
   decomposing via a computer an ocular region into several filtered images of different orientation and scale;
   using the computer to combine the decomposed images for each scale;
   using a computer executed classifier for each scale, matching across different quality images; and
   using a computer, constructing a matching score by combining the scale scores using adaptively weighted sum for each scale.

2. The method of claim 1 wherein decomposing the ocular region comprises using a Gabor filter bank with discriminatively tuned parameters.

3. The method of claim 1 wherein decomposing the ocular region comprises using a Log Gabor filter bank with discriminatively tuned parameters.

4. The method of claim 1 wherein the classifier comprises a fisher classifier.

5. The method of claim 1 wherein the weights are based on energy of each scale normalized by a total energy of all scales.

6. The method of claim 1 wherein the weights are based on an ocular quality measure.

7. A system comprising:
   a module to decompose via a computer an ocular region into several filtered images of different orientation and scale;
   a module to use the computer to combine the decomposed images for each scale;
   a module to use a computer executed classifier for each scale, matching across different quality images; and
   a module to use a computer to construct a matching score by combining the scale scores using adaptively weighted sum for each scale.

8. The system of claim 7 wherein decomposing the ocular region comprises using a Gabor filter bank or Log Gabor filter bank with discriminatively tuned parameters.

9. The system of claim 8 wherein the classifier comprises a fisher classifier.

10. The method of claim 1 wherein the weights are based on energy of each scale normalized by a total energy of all scales.

* * * * *